UNITED STATES PATENT OFFICE.

JOSEPH FREIHERR VON MERING, OF HALLE-ON-THE-SAALE, GERMANY.

SUBSTITUTION PRODUCT OF PHENETIDIN.

SPECIFICATION forming part of Letters Patent No. 535,846, dated March 19, 1895.

Application filed June 29, 1894. Serial No. 516,110. (Specimens.)

*To all whom it may concern:*

Be it known that I, JOSEPH FREIHERR VON MERING, a subject of the German Emperor, residing at 16$^b$ Alte Promenade, Halle-on-the-Saale, Germany, have invented certain new and useful Improvements in and Relating to the Production of Substitution Products of Phenetidin; and I do hereby declare the following to be a clear and exact description of the invention.

My invention has for its object the production of substitution products of phenetidin

in which a hydrogen atom of the amido group (NH$_2$) is replaced by an acid remainder, that is to say, by the acidyl (C$_2$H$_5$CO, or C$_3$H$_7$CO) of propionic or butyric acid. Both these acid remainders or acidyls may be designated as propionyl and butyryl.

The new substitution products referred to, namely, the propionylphenetidin

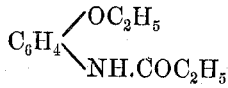

and the butyrylphenetidin

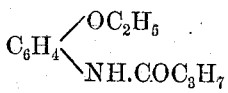

both normal as well as the iso-butyrylphenetidin, possess alexipyretic properties, and in accordance with my invention they are obtained by propionylizing or butyrylizing the phenetidin, *i. e.*, by the action of propionyl or butyryl compounds on phenetidin. Such action may be effected by heating one molecule phenetidin with about one molecule of an acid remainder of the acid series CNH$_2$NO$_2$ as propionic acid, or one molecule normal or iso-butyric acid, the reaction being materially accelerated by the use of condensation material, as for instance, chlorid of zinc. The reaction may also be effected by combining one molecule of propionyl chlorid or butyryl chlorid with one molecule of phenetidin; or by the action of propionic acid anhydrid, or normal or iso-butyric acid anhydrid upon phenetidin, or by heating phenetidin hydrochlorid or butyryl hydrochloride with propionic or butyric salts, as the alkali salts thereof.

The phenetidin compounds which are nearly or practically insoluble in water are then removed from the soluble by-products or salts that may have been formed during the reaction, by boiling the reaction mixture in water, the insoluble phenetidin compounds being separated from the soluble in any suitable manner, and finally purified by crystallization out of alcohol, in which latter the said phenetidin combinations are readily soluble.

As already stated, the described substitution products of phenetidin possess alexipyretic properties and are difficult of solution in hot water but are readily soluble in alcohol and ether, their constitution or composition corresponding with that of phenetidin, in which one hydrogen atom of the amido group in the phenetidin is replaced by an acidyl or acid remainder, as propionyl (COC$_2$H$_5$) or butyryl (COC$_3$H$_7$).

The propionyl phenetidin crystallizes in the form of long white needles, the melting point of which is from about 120° to 122° centigrade, while both the normal as well as the iso-butyryl phenetidin crystallize in the form of white needles, the melting point of which is about 110° and about 130° centigrade, respectively. These bodies are mild febrifuges. They differ from and possess the advantage over the well-known phenacetin (aceto para-phenetidin) in that they are more difficult of solution in water, and consequently are absorbed more slowly, that is to say, they are decomposed more slowly when taken internally, so that their alexi or anti pyretic properties exert themselves more mildly and slowly, to which their increased molecular weight as compared with that of phenetidin and of the formyl and acetyl derivation products thereof contribute materially.

The phenetidin compounds which form the subject matter of this invention differ chemically from phenacetin in that they are phenetidins in which one oxygen atom of the amido group in the phenetidin is replaced by an acidyl or an acid remainder, of the acid series CNH$_2$NO$_2$ as propionyl or butyryl, of greater molecular weight than acetyl, which latter atomic group is present in phenacetin.

The phenetidin combinations obtained according to my invention can be administered in doses of about 0.5 grams, and will reduce a fever temperature from 2° to 5° very slowly. The lowering of the temperature is not accompanied by transpiration, while a rise in temperature is not preceded by a chill.

Having thus described my invention, what I claim as new therein, and desire to secure by Letters Patent, is—

1. As new chemical products, the herein described antipyretic bodies, said bodies being difficult of solution in water, readily soluble in alcohol and ether, and whose composition corresponds with that of phenetidin in which one hydrogen atom of the amido group is replaced by an acid remainder of the acid series $CNH_2NO_2$ of greater molecular weight than acetyl.

2. As new chemical products, antipyretic bodies that are difficult of solution in water, are readily soluble in alcohol and ether, and whose composition corresponds with that of phenetidin in which one hydrogen atom of the amido group is replaced by an acid remainder, as propionyl or butyryl, of greater molecular weight than acetyl.

3. The process of producing the herein-described antipyretic bodies, which consists in heating together phenetidin and an acid remainder of the acid series $CNH_2NO_2$ in such proportions that one hydrogen atom of the amido group in the phenetidin is replaced by an acid remainder of greater molecular weight than acetyl, substantially as described.

4. The process of producing the herein-described antipyretic bodies, which consists in heating together phenetidin, a suitable acid, as propionic or butyric acid and a condensation product as zinc chlorid, in such proportions that one hydrogen atom of the amido group in the phenetidin is replaced by an acid remainder of greater molecular weight than acetyl, substantially as described.

In testimony whereof I have signed my name in the presence of two witnesses.

JOSEPH FREIHERR VON MERING.

Witnesses:
RUDOLPH FRICKE,
OTTO DOEDERLEIN.